(12) United States Patent
Boutboul et al.

(10) Patent No.: US 8,055,750 B2
(45) Date of Patent: Nov. 8, 2011

(54) AUTONOMOUS MANAGEMENT OF A COMMUNICATION NETWORK

(75) Inventors: Irwin Boutboul, Jersey City, NJ (US); Albert Delucca, Wantagh, NY (US); Jean-David C. Gibrat, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 12/271,025

(22) Filed: Nov. 14, 2008

(65) Prior Publication Data

US 2010/0125634 A1    May 20, 2010

(51) Int. Cl.
  G06F 15/173    (2006.01)
  G06F 15/16     (2006.01)
  G06Q 99/00     (2006.01)
(52) U.S. Cl. .................... 709/223; 709/206; 705/319
(58) Field of Classification Search .............. 709/206, 709/224; 705/319
  See application file for complete search history.

(56) References Cited

U.S. PATENT DOCUMENTS

| | | | |
|---|---|---|---|
| 7,069,308 | B2 | 6/2006 | Abrams |
| 7,844,671 | B1 * | 11/2010 | Lawler et al. ............. 709/206 |
| 2006/0042483 | A1 | 3/2006 | Work et al. |
| 2006/0282303 | A1 * | 12/2006 | Hale et al. ............... 705/10 |
| 2007/0103296 | A1 | 5/2007 | Paessel et al. |
| 2007/0250483 | A1 | 10/2007 | Blue et al. |
| 2007/0271272 | A1 | 11/2007 | McGuire et al. |
| 2007/0282877 | A1 | 12/2007 | Fischer et al. |
| 2007/0288602 | A1 * | 12/2007 | Sundaresan ............. 709/219 |
| 2008/0077595 | A1 | 3/2008 | Leebow |
| 2008/0222308 | A1 * | 9/2008 | Abhyanker ............. 709/245 |
| 2009/0037470 | A1 | 2/2009 | Schmidt |
| 2009/0222522 | A1 | 9/2009 | Heaney |
| 2009/0319288 | A1 | 12/2009 | Slaney et al. |
| 2010/0011081 | A1 | 1/2010 | Crowley et al. |
| 2010/0180029 | A1 | 7/2010 | Fourman |

OTHER PUBLICATIONS

Jordi Sabater, et al., Reputation and Social Network Analysis in Multi-Agent Systems, AAMAS'02, Jul. 15-19, 2002, Bologna, Italy, Copyright 2002, 8 pages.
U.S. Appl. No. 12/271,001, filed Nov. 14, 2008.

* cited by examiner

*Primary Examiner* — Joseph Avellino
*Assistant Examiner* — Jeong S Park
(74) *Attorney, Agent, or Firm* — Cantor Colburn LLP; Derek Jennings

(57) ABSTRACT

A method, system, and computer program product for autonomous management of a communication network are provided. The communication network includes a community of registered and unregistered users. The method includes segmenting a body of data according to pre-defined aspects that identify related subject matter and a volume of data stored for each of the segments based on the volume of data. The method also includes classifying each of the registered users according to the segments, and identifying from the classification: a population size of users associated with corresponding segments and a proportion of users to corresponding segments. The method further includes assessing aspects of an unregistered user, based upon a communication, in view of pre-defined growth criteria established for the communication network and, upon determining the aspects fall within limits specified by the pre-defined growth criteria, presenting the unregistered user with an invitation to register with the community.

25 Claims, 3 Drawing Sheets

AUTONOMOUS MANAGEMENT OF A COMMUNICATION NETWORK

CROSS REFERENCE TO RELATED APPLICATIONS

This application is related to co-pending application U.S. application Ser. No. 12/271,001 filed Nov. 14, 2008, the contents of which are incorporated by reference herein in their entirety.

BACKGROUND

The present invention relates to communications networking, and more specifically, to a method, system, and computer program product for autonomous management of a communication network.

Networking sites such as Facebook®, LinkedIn®, and Match.com® provide the ability for individuals to associate and/or collaborate with other individuals over a network. These, and other, networking sites typically involve a community of users who share some common purpose (e.g., business/professional, social, goal-oriented—such as eDiets.com®, etc.). Various networking sites rely on users to be the vehicle of growth for the community; that is, the sites rely on factors such as the level of active engagement by individuals in the community, word of mouth, advertising, and other forms of communication in order to provide awareness of the system's existence. This can often lead to unbalanced growth within niche markets, resulting in large networks that are not very diverse in population. Take for example, social networking systems, such as Facebook® and MySpace®. These networks have grown very large, but are focused and segmented, becoming very popular among teenage and young adults. This may be a direct result of relying on a natural organic way of growing the network, in which the users of the community promote the growth. Networking sites that are not able to effectively maintain interest, e.g., lacking in diversity of members and information, may not be able to sustain, as the information and population becomes stale over time.

What is needed, therefore, is a network management system and services that enable autonomous growth and change through discovering and analyzing connections (communications) between registered and unregistered (unknown but identifiable) users in a communication network, and is thereby capable of providing diversity of user population and subject matter.

SUMMARY

According to one embodiment of the present invention, a method for autonomous management of a communication network is provided. The communication network includes a community of registered and unregistered users. The method includes segmenting a body of data according to pre-defined aspects that identify related subject matter and a volume of data stored for each of the segments based on the volume of data. The method also includes classifying each of the registered users according to the segments, and identifying from the classification: a population size of users associated with corresponding segments and a proportion of users to corresponding segments. The method further includes assessing aspects of an unregistered user, based upon a communication, in view of pre-defined growth criteria established for the communication network and, upon determining the aspects fall within limits specified by the pre-defined growth criteria, presenting the unregistered user with an invitation to register with the community.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description, taken in conjunction with the accompanying drawings, in which:

DETAILED DESCRIPTION

Exemplary embodiments of the invention provide a communication network management system and services that enable autonomous growth through discovering and analyzing connections (communications) between registered and unregistered (unknown but identifiable) users in a communication network. The communication network management system (also referred to herein as "network management system" and "communication network") employs pre-defined growth criteria for determining how and when to grow the communication network. The determination is made autonomously without any intervention or action on the part of the users of the network community.

Figure 1:
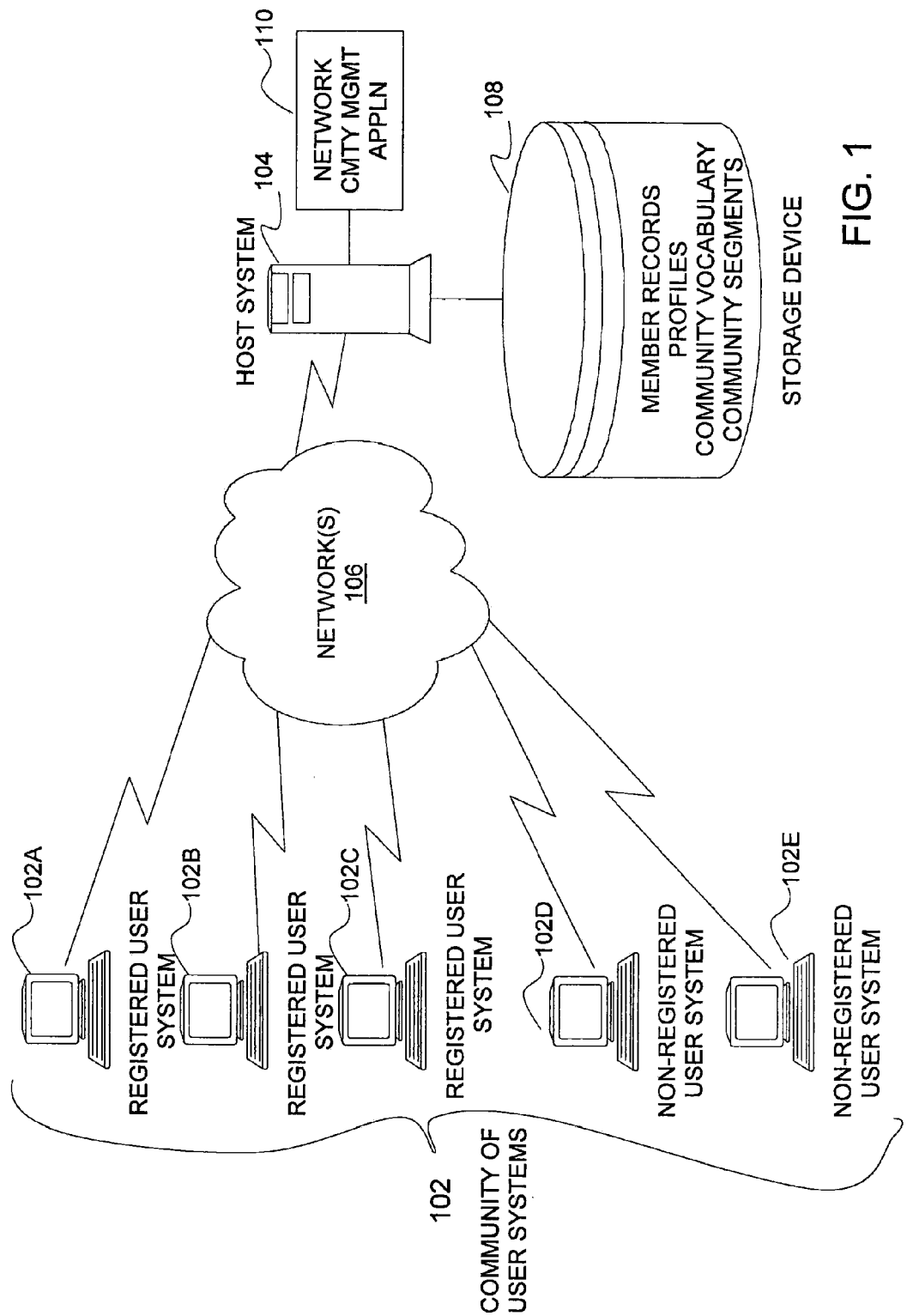
FIG. 1 depicts a block diagram of a system upon which communication network management services may be implemented in an exemplary embodiment.

With reference now to FIG. 1, an exemplary system upon which the communication network management services may be implemented will now be described. The system of FIG. 1 includes a community of user systems 102 in communication with a host system 104 over one or more networks 106. The host system 104 executes computer instructions for performing the communication network services described herein. The host system 104 is also communicatively coupled to a storage device 108.

The user systems 102 each represent computer processing devices through which users at one or more geographic locations may contact the host system 104. As shown in FIG. 1, the user systems 102 may be coupled to the host system 104 via network(s) 106. Each user system 102 may be implemented using a general-purpose computer executing a computer program for carrying out the processes described herein. The user systems 102 may be personal computers (e.g., a lap top, a personal digital assistant) or host attached terminals. If the user systems 102 are personal computers, the processing described herein may be shared by a user system 102 and the host system 104 (e.g., by providing an applet to the user system 102).

The network(s) 106 may be any type of known networks including, but not limited to, a wide area network (WAN), a local area network (LAN), a global network (e.g. Internet), a virtual private network (VPN), and an intranet. The network 106 may be implemented using a wireless network or any kind of physical network implementation known in the art. A user system 102 may be coupled to the host system through multiple networks (e.g., intranet and Internet) so that not all user systems 102 are coupled to the host system 104 through the same network. One or more of the user systems 102 and the host system 104 may be connected to the network 106 in a wireless fashion. In one embodiment, the network is an intranet and one or more user systems 102 execute a user interface application (e.g., a web browser) to contact the host system 104 through the network 106. In another exemplary embodiment, one or more of the user systems 102 is connected directly (i.e., not through the network 106) to the host system 104 and the host system 104 is connected directly to or contains the storage device 108.

The storage device 108 includes a data repository with data relating to managing the communication network services and may be implemented using a variety of devices for storing electronic information. It is understood that the storage device 108 may be implemented using memory contained in the host system 104 or that it may be a separate physical device (e.g., as shown in FIG. 1). The storage device 108 is logically addressable as a consolidated data source across a distributed environment that includes network(s) 106. Information stored in the storage device 108 may be retrieved and manipulated via the host system 104 and/or via the user systems 102.

The data repository includes one or more databases containing documents, files, and related data in support of the communication networking services. In an exemplary embodiment, the storage device 108 stores member records, user profile records, community vocabulary database, and a segmented body of data. The member records may include, e.g., personal/identification information related to a registered member of the communication networking services. The member records may be used to identify each of its members, e.g., via the user's email address or other identifying information. The user profile records store user-selected attribute information that describes various characteristics of each of the registered users in the community. The user profile records may include pre-established attribute fields for guiding the user in creating a user profile, or alternatively, the user profile records may include user-defined and/or community-defined/refined attribute information, such as that described in co-pending application, filed on Nov. 14, 2008, Ser. No. 12/271,001, entitled, "METHOD, SYSTEM, AND COMPUTER PROGRAM PRODUCT FOR IMPLEMENTING A COMMUNITY-DEFINED AND MANAGED COMMUNICATION NETWORK," the contents of which are incorporated by reference herein in its entirety. The above-reference co-pending application provides an extended networking system that enables users to define themselves and their community of users, such that a single profile can be implemented and maintained by each user for the purpose of serving any type of objective (e.g., personal, social, professional, goal-oriented, etc.). The community vocabulary database and segmented body of data will be described further herein.

The host system 104 depicted in FIG. 1 may be implemented using one or more servers operating in response to a computer program stored in a storage medium accessible by the server. The host system 104 may operate as a network server (e.g., a web server) to communicate with the user systems 102. The host system 104 handles sending and receiving information to and from the user systems 102 and can perform associated tasks.

The host system 104 may also operate as an application server. The host system 104 executes one or more computer programs to provide the communication network management services. As shown in FIG. 1, the host system 104 executes a network management application 110 (also referred to herein as "network manager") for implementing the communication networking services described herein. The application 110 also includes a messaging component for facilitating communications among users of the services. Processing may be shared by the user systems 102 and the host system 104 by providing an application (e.g., java applet) to the user systems 102. Alternatively, the user systems 102 can include stand-alone software applications for performing a portion or all of the processing described herein. As previously described, it is understood that separate servers may be utilized to implement the network server functions and the application server functions. Alternatively, the network server and the application server may be implemented by a single server executing computer programs to perform the requisite functions.

As shown in FIG. 1, the user systems 102 collectively form a community of users of the communication network management services. User systems 102A-102C represent users who are registered members of the communication network management services (e.g., each of the users has registered with the host system 104 and a corresponding member record and user profile exists in the storage device 108). User systems 102D and 102E represent users who are not registered members of the communication network management services but who may communicate with registered and non-registered users, although these users may be provided with restricted access to the services or may be allowed limited functions.

In one embodiment, the network manager 110 provides a user interface that enables users to register for the communication network. Member records are created for the registered users and stored in the storage device 108. In an exemplary embodiment, the storage device 108 also stores a body of data that includes information supplied by the registered users in the community, e.g., photos, video, text documents, and multi-media content. In one example, users who are interested in landscape photography may supply related information including photos (and corresponding camera settings for informing other users how to achieve the same "look"), information about top-rated photography equipment, suppliers of photography equipment, information about upcoming photography classes, and professional photographers for hire, to name a few. Likewise, the individual users of the community may offer opinions on, or updates to, any of the above-supplied information. Of course, it will be understood that the body of data can include information relating to any number of topics or categories of information and the example provided above is for illustrative purposes and not intended to be limiting in scope.

Figure 2:
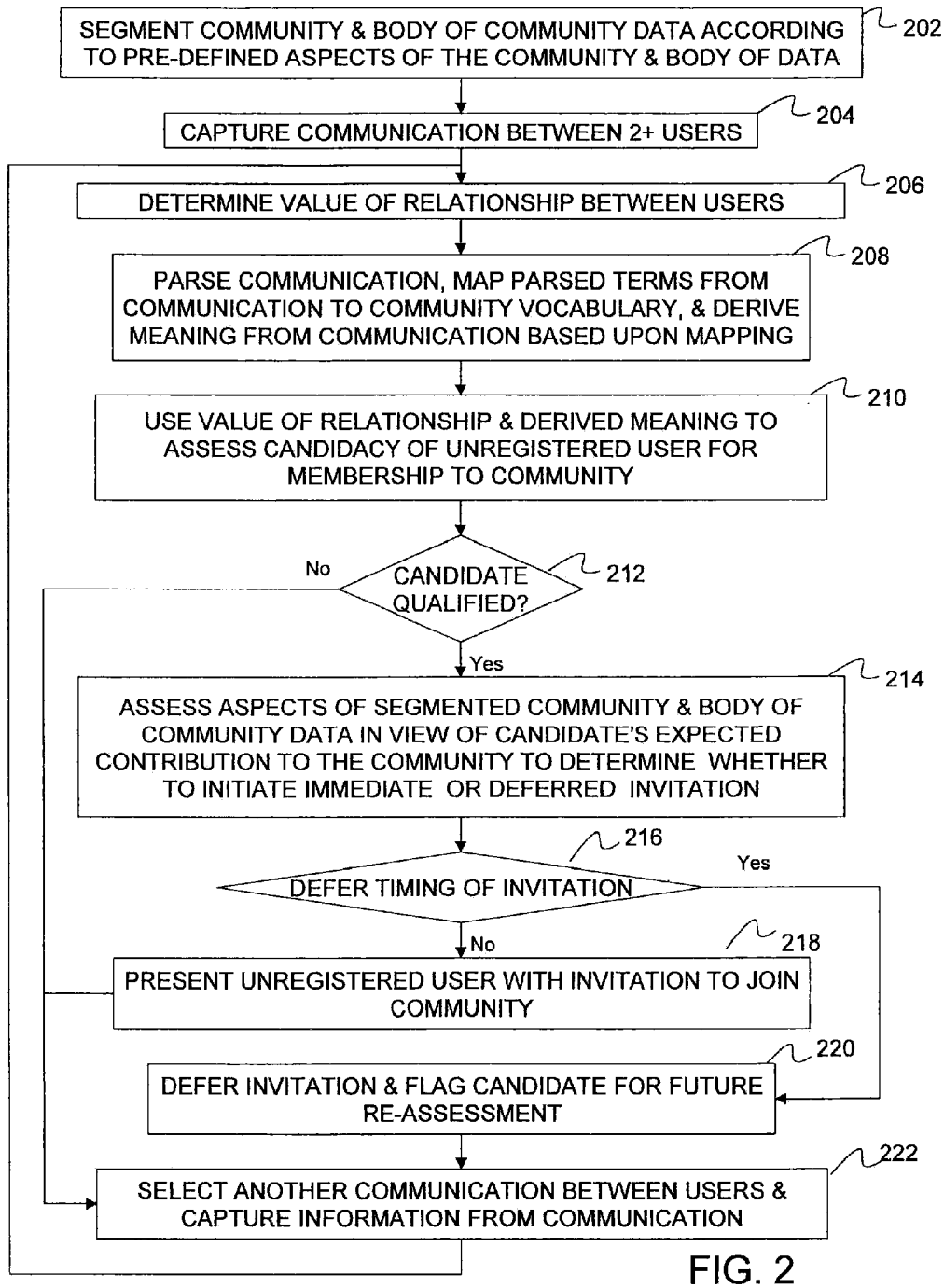
FIG. 2 illustrates a flow diagram describing a process for implementing the communication network management services in an exemplary embodiment.
Figure 3:
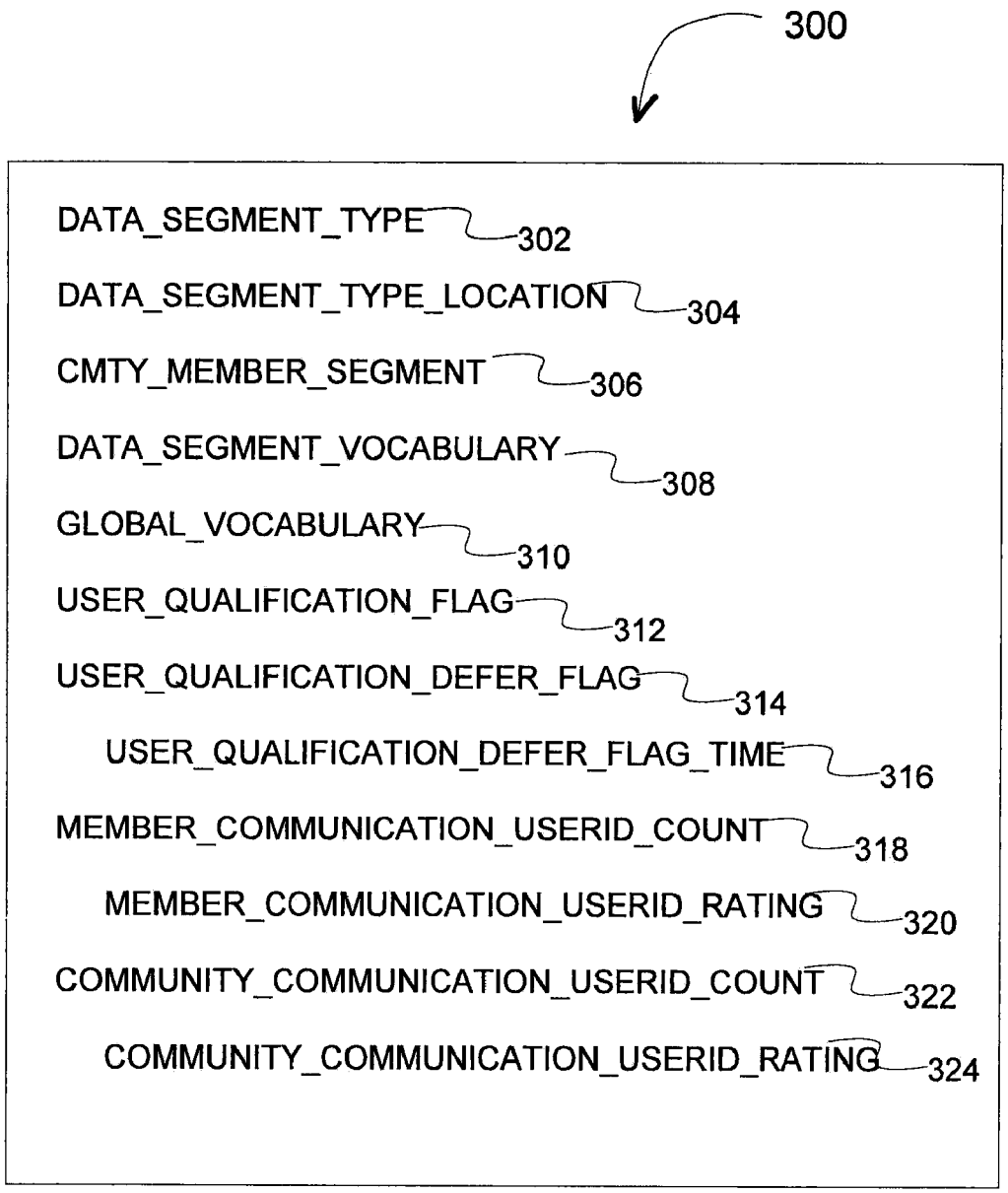
FIG. 3 depicts a sample data structure used in implementing the communication network management services in an exemplary embodiment.

Once a community of registered users is in place, the network manager 110 works autonomously to provide additional functionality. For example, the network manager 110 can process communications conducted by users, registered or not, e.g., using natural language processing, to identify relationships among the users and take various actions accordingly. These features will now be described with reference to FIGS. 2 and 3. Step 202 relates to a set-up process which may be performed upon initialization of the community network management services, and/or may be periodically performed to update the body of data stored in the storage device 108 as dictated by the needs of the community. As shown in FIG. 3 a sample data structure 300 may be used to facilitate the community network management services, as described herein.

At step 202, the network manager application 100 segments the body of data maintained by the network manager application 110 in a storage device (e.g., storage device 108) in communication with the host system computer 104, where the body of data is segmented according to pre-defined aspects that identify related subject matter and volume of data stored for each of the segments based on the volume of data. These aspects are pre-defined as socially generated data (e.g., attributes, tags, data related to attributes, etc.). As shown in FIG. 3, the network manager application 110 may segment the body of data via the DATA_SEGMENT_TYPE field 302. For example, the TYPE may be photography, sports cars, medicine, pop music, or any body of data that can be segmented according to a subject. The segmented data may be stored in separate locations in the storage device 108 to facilitate search and retrieval. This may be implemented using the DATA_SEGMENT_TYPE_LOCATION field 304 in the data structure 300.

The network manager application 110 also classifies each of the registered users (e.g., users at registered user systems 102A-102C) according to one or more of the segments, and uses the classification results to identify a population size of registered users associated with corresponding segments, as well as a proportion of registered users to the corresponding segments. For example, as shown in FIG. 3, the network manager application 110 may employ the CMTY_MEMBER_SEGMENT field 306 in the data structure 300 for this purpose.

At step 204, a messaging component of the network manager application 110 captures a communication between at least two users, at least one of the users unregistered to the community of users. The messaging component may be an email or instant messaging tool, a community forum, or other type of communication system.

At step 206, the network manager application 110 determines a value of a relationship between the two users based upon, e.g., a frequency of documented communications previously conducted between the two users. For example, in the data structure 300 illustrated in FIG. 3, the network manager application 110 utilizes MEMBER_COMMUNICATION_USERID_COUNT field 318 and MEMBER_COMMUNITY_USERID_RATING field 320, respectively for these functions.

At step 208, the network manager application 110 parses the communication, maps parsed terms to the community vocabulary of terms stored in the storage device 108 and maintained by the host system computer 104, and derives meaning and context from the communication based upon the mapping. The network manager application uses the meaning and context to identify a segment of the body of data that corresponds to the subject matter of the communication. These features may be accomplished, e.g., using a DATA_SEGMENT_VOCABULARY field 308, as well as a GLOBAL_VOCABULARY field 310.

At step 210, the network manager application 110 assesses the candidacy of the unregistered user for membership to the community using the value of the relationship between the two users and the derived meaning and context of the communication. In step 210, the candidacy assessment is performed to determine what, if any, value the unregistered user may offer to the community in terms of knowledge, character, interest, etc. Thus, a high value (e.g., a pre-defined numerical scale may be used to rate the value of the potential candidate). In one embodiment, a high value rating may indicate that a high frequency of documented communications have occurred between the registered user and the unregistered user, thereby suggesting that the unregistered user is a valued contributor to the community. In another embodiment, the value assigned to the unregistered user may be based upon a frequency of documented communications between the unregistered user and other registered users in the community (which, e.g., may be implemented via the COMMUNITY_COMMUNICATION_USERID_COUNT field 322 and COMMUNITY_COMMUNICATION_USER_RATING field 324, as shown in FIG. 3. In yet a further embodiment, the value may be calculated based upon a frequency/time function (e.g., a number of documented communications divided by a time span in which the communications occurred). In an exemplary embodiment, the candidacy assessment is autonomously implemented by the network manager application 110 without input or action taken (e.g., request) by the community with respect to the assessment, such that the membership of the community is defined by the communication network itself and not by the individual members of the community.

At step 212, it is determined by the network manager application 110 whether the candidate is qualified for membership to the community (e.g., has a value rating that indicates an expectancy that the candidate will be a positive contributor to the community).

At step 212, if the candidate is deemed to be qualified for membership, the network manager application 110 sets a USER_QUALIFICATION_FLAG 312 accordingly, and assesses aspects of the unregistered user, based upon, e.g., the content of the communication and corresponding mappings to the community vocabulary, which is identified with a corresponding segment of the body of data in which the unregistered user is associated (e.g., a segment related to photography), in view of pre-defined growth criteria established for the communication network at step 214. The assessment is performed to determine whether to invite the unregistered user to sign up for the community or to defer the invitation until a future time. In an exemplary embodiment, the pre-defined growth criteria establish limits on the growth and direction of the community network. The limits on the growth and direction of the network are designed to enable the community network to evolve and grow over time while maintaining a balance. The balance may relate to a number of factors, such as an agreed upon proportion of registered users associated with a segment of the body of data to the corresponding segment of data. In other words, the community network controls the balance of registered users to available data, so that unregistered users who may be qualified for memberships associated with a segment of data that has a large proportion of users to the data may be deferred for membership until the population of corresponding registered users decreases (e.g., via a set threshold value), or the body of available data increases. In addition, or alternatively, the community network may seek to grow one segment of the community that is under-populated according to the pre-defined growth criteria. Accordingly, when the community network identifies a candidate for this particular segment, an invitation to join may be immediately extended to the candidate as described herein.

At step 216, the network manager application 110 determines whether to defer the timing of the invitation based upon the assessment performed in step 214. If not, network manager application 110 sets a USER_QUALIFICATION_DEFER_FLAG 312 accordingly, AND the unregistered user is presented with an invitation to join the community at step 218. This invitation may be implemented, e.g., via the user interface of the network manager application 110. In one embodiment, the network manager application 110 auto-generates and delivers the invitation to the unregistered user. In another embodiment, the network manager application 110 prompts the registered user (associated with the communication) to extend the invitation.

If the results of the assessment dictate a deferred invitation at step 216, an invitation to join the community is not extended to the unregistered user; however, the unregistered user may be flagged for future consideration at step 220, by setting the USER_QUALIFICATION_DEFER_FLAG field 314 and the USER_QUALIFICATION_DEFER_FLAG_TIME field 316 to set a time in which to initiate another qualification assessment. If the invitation is deferred at step 220, or alternatively, if the candidate is not qualified for membership at step 212, then the network manager application 110 sets the corresponding USER_QUALIFICATION_DEFER_FLAG field 314 or USER_QUALIFICATION_FLAG field 312, respectively, and proceeds to another communication conducted between users in the community at step 222. In any event, the community vocabulary is updated in the storage device 108, via one or more of fields 302-310, and the count fields 318 and/or 322 are updated to reflect the communication and its parsed terms and mappings.

As described above, the communication network management services enable autonomous growth through discovering and analyzing connections (communications) between registered and unregistered (unknown but identifiable) users in a communication network. The communication network management system employs pre-defined growth criteria for determining how and when to grow the communication network. The determination is made autonomously without any intervention or action on the part of the users of the network community.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the preferred embodiment to the invention has been described, it will be understood that those skilled in the art, both now and in the future, may make various improvements and enhancements which fall within the scope of the claims that follow. These claims should be construed to maintain the proper protection for the invention first described.

What is claimed is:

1. A method for autonomous management of a communication network, the communication network including a community of registered users and unregistered users who are identifiable by the communication network, the registered and unregistered users each operating a computer processor, and each computer processor is in communication with a host system computer over the communication network, the method comprising:
    segmenting, via a network manager application executing on the host system computer, a body of data maintained by the network manager application in a storage device in communication with the host system computer, the body of data segmented according to pre-defined aspects that identify related subject matter and volume of data stored for each of the segments based on the volume of data;
    classifying, via the network manager application, each of the registered users according to one or more of the segments, and identifying from the classification: a population size of users associated with corresponding segments, and a proportion of users to corresponding segments;
    capturing, via a messaging component of the host system, a communication between at least two users, at least one of the users unregistered to the community of users;
    assessing aspects of the unregistered user, based upon the communication, in view of pre-defined growth criteria established for the communication network; and
    upon determining the aspects of the unregistered user fall within limits specified by the pre-defined growth criteria, presenting, via a user interface of the network manager application, the unregistered user with an invitation to register with the community.

2. The method of claim 1, further comprising:
    determining, via the network manager application, a value of a relationship between the two users based upon a frequency of documented communications previously conducted between the two users;

the network manager application further performing:
parsing the communication, mapping parsed terms to a vocabulary of terms in a database maintained by the communications network, deriving meaning and context from the communication based upon the mapping, and using the meaning and context to identify a segment corresponding to the subject matter of the communication; and
assessing candidacy of the unregistered user for membership to the community using the value of the relationship between the two users and the derived meaning and context of the communication, the candidacy assessment autonomously implemented by the network manager application without input or action taken by the community with respect to the assessment;
wherein presenting the unregistered user with an invitation to register with the community further includes presenting the user with the invitation upon successful qualification of the candidacy assessment.

3. The method of claim 2, wherein the vocabulary of terms further comprises results of parsing and mapping the documented communications between the two users; and,
wherein assessing candidacy of the unregistered user includes using a derived meaning and context of the documented communications to qualify the unregistered user for membership in the community.

4. The method of claim 2, wherein assessing aspects of the unregistered user in view of pre-defined growth criteria established for the communication network includes evaluating a proportion of registered users to a corresponding segment of data, and determining whether a threshold value has been reached in response to the evaluation.

5. The method of claim 4, further comprising:
deferring presentation of the invitation for future consideration when the threshold value has been reached; and
denying presentation of the invitation when it is determined that the unregistered user fails the candidacy assessment.

6. The method of claim 2, further comprising:
updating the vocabulary of terms in the database to reflect the parsed terms in the communication.

7. The method of claim 2, wherein, upon acceptance of the invitation by the unregistered user, updating the population size of the corresponding segment to reflect the new member.

8. The method of claim 1, wherein the communication is at least one of:
an email;
an instant message; and
a network forum.

9. The method of claim 1, wherein presenting the invitation to the unregistered user includes at least one of:
prompting the registered user of the communication to extend the invitation; and
auto-generating and transmitting the invitation to the unregistered user.

10. A system for autonomous management of a communication network, the communication network including a community of registered users and unregistered users who are identifiable by the communication network, the registered and unregistered users each operating a computer processor, the system comprising:
a host system computer in communication with the computer processors over the communication network; and
a network manager application including a user interface executing on the host system computer, the network manager application performing a method, comprising:
segmenting a body of data maintained by the network manager application in a storage device in communication with the host system computer, the body of data segmented according to pre-defined aspects that identify related subject matter and volume of data stored for each of the segments based on the volume of data;
classifying each of the registered users according to one or more of the segments and identifying from the classification: a population size of users associated with corresponding segments and a proportion of users to corresponding segments;
capturing, via a messaging component of the network manager application, a communication between at least two users, at least one of the users unregistered to the community of users;
assessing aspects of the unregistered user, based upon the communication, in view of pre-defined growth criteria established for the communication network; and
upon determining the aspects of the unregistered user fall within limits specified by the pre-defined growth criteria, presenting, via the user interface of the network manager application, the unregistered user with an invitation to register with the community.

11. The system of claim 10, wherein the network manager application further performs:
determining a value of a relationship between the two users based upon a frequency of documented communications previously conducted between the two users;
parsing the communication, mapping parsed terms to a vocabulary of terms in a database maintained by the communications network, deriving meaning and context from the communication based upon the mapping, and using the meaning and context to identify a segment corresponding to the subject matter of the communication; and
assessing candidacy of the unregistered user for membership to the community using the value of the relationship between the two users and the derived meaning and context of the communication, the candidacy assessment autonomously implemented by the network manager application without input or action taken by the community with respect to the assessment;
wherein presenting the unregistered user with an invitation to register with the community further includes presenting the user with the invitation upon successful qualification of the candidacy assessment.

12. The system of claim 11, wherein the vocabulary of terms further comprises results of parsing and mapping the documented communications between the two users; and,
wherein assessing candidacy of the unregistered user includes using a derived meaning and context of the documented communications to qualify the unregistered user for membership in the community.

13. The system of claim 11, wherein assessing aspects of the unregistered user in view of pre-defined growth criteria established for the communication network includes evaluating a proportion of registered users to a corresponding segment of data, and determining whether a threshold value has been reached in response to the evaluation.

14. The system of claim 13, wherein the network manager application further performs:
deferring presentation of the invitation for future consideration when the threshold value has been reached; and
denying presentation of the invitation when it is determined that the unregistered user fails the candidacy assessment.

15. The system of claim 11, wherein the network manager application further performs:
    updating the vocabulary of terms in the database to reflect the parsed terms in the communication.

16. The system of claim 11, wherein, upon acceptance of the invitation by the unregistered user, the network manager application updates the population size of the corresponding segment to reflect the new member.

17. The system of claim 10, wherein the communication is at least one of:
    an email;
    an instant message; and
    a network forum.

18. A computer program product including a non-transitory computer-readable storage medium having program code embodied thereon, the computer program product providing autonomous management of a communication network, the communication network including a community of registered users and unregistered users who are identifiable by the communication network, the registered and unregistered users each operating a computer processor, and each computer processor is in communication with a host system computer over the communication network, the program code including instructions for causing the host system computer to implement a method, the method comprising:
    segmenting a body of data maintained in a storage device in communication with the host system computer, the body of data segmented according to pre-defined aspects that identify related subject matter and volume of data stored for each of the segments based on the volume of data;
    classifying each of the registered users according to one or more of the segments and identifying from the classification: a population size of users associated with corresponding segments and a proportion of users to corresponding segments;
    capturing a communication between at least two users, at least one of the users unregistered to the community of users;
    assessing aspects of the unregistered user, based upon the communication, in view of pre-defined growth criteria established for the communication network; and
    upon determining the aspects of the unregistered user fall within limits specified by the pre-defined growth criteria, presenting the unregistered user with an invitation to register with the community.

19. The computer program product of claim 18, further comprising instructions for implementing:
    determining a value of a relationship between the two users based upon a frequency of documented communications previously conducted between the two users;
    parsing the communication, mapping parsed terms to a vocabulary of terms in a database maintained by the communications network, deriving meaning and context from the communication based upon the mapping, and using the meaning and context to identify a segment corresponding to the subject matter of the communication; and
    assessing candidacy of the unregistered user for membership to the community using the value of the relationship between the two users and the derived meaning and context of the communication, the candidacy assessment autonomously implemented without input or action taken by the community with respect to the assessment;
    wherein presenting the unregistered user with an invitation to register with the community further includes presenting the user with the invitation upon successful qualification of the candidacy assessment.

20. The computer program product of claim 19, wherein the vocabulary of terms further comprises results of parsing and mapping the documented communications between the two users; and,
    wherein assessing candidacy of the unregistered user includes using a derived meaning and context of the documented communications to qualify the unregistered user for membership in the community.

21. The computer program product of claim 19, wherein assessing aspects of the unregistered user in view of pre-defined growth criteria established for the communication network includes evaluating a proportion of registered users to a corresponding segment of data, and determining whether a threshold value has been reached in response to the evaluation.

22. The computer program product of claim 21, further comprising instructions for implementing:
    deferring presentation of the invitation for future consideration when the threshold value has been reached; and
    denying presentation of the invitation when it is determined that the unregistered user fails the candidacy assessment.

23. The computer program product of claim 18, further comprising instructions for implementing:
    updating the vocabulary of terms in the database to reflect the parsed terms in the communication.

24. The computer program product of claim 18, wherein, upon acceptance of the invitation by the unregistered user, updating the population size of the corresponding segment to reflect the new member.

25. The computer program product of claim 18, wherein the communication is at least one of:
    an email;
    an instant message; and
    a network forum.

* * * * *